United States Patent [19]
Tanabe et al.

[11] Patent Number: 4,672,639
[45] Date of Patent: Jun. 9, 1987

[54] SAMPLING CLOCK PULSE GENERATOR

[75] Inventors: Toshiyuki Tanabe, Ageo; Minoru Noguchi, Hanyu, both of Japan

[73] Assignee: Kabushiki Kaisha Toshiba, Kawasaki, Japan

[21] Appl. No.: 736,370

[22] Filed: May 21, 1985

[30] Foreign Application Priority Data

| May 24, 1984 | [JP] | Japan | 59-105121 |
| May 24, 1984 | [JP] | Japan | 59-105122 |
| May 24, 1984 | [JP] | Japan | 59-105123 |

[51] Int. Cl.$^4$ .............................................. H04L 7/00
[52] U.S. Cl. ........................................ 375/118; 328/75; 328/155
[58] Field of Search ............... 375/106, 118, 119; 328/72, 75, 155, 179; 331/45; 370/100

[56] References Cited

U.S. PATENT DOCUMENTS

| 3,633,115 | 1/1972 | Epstein | 328/155 |
| 3,959,589 | 5/1976 | Roesgen | 375/118 |
| 4,400,666 | 8/1983 | Sekiguchi | 328/75 |
| 4,573,173 | 2/1986 | Yoshida | 375/118 |
| 4,600,943 | 7/1986 | Tanabe | 375/118 |

FOREIGN PATENT DOCUMENTS

| 0021132 | 7/1981 | European Pat. Off. . |
| 0056649 | 7/1982 | European Pat. Off. . |
| 568544 | 2/1978 | Japan . |
| 5841031 | 8/1980 | Japan . |
| 598104 | 3/1981 | Japan . |
| 2129658 | 5/1984 | United Kingdom . |

Primary Examiner—Benedict V. Safourek
Attorney, Agent, or Firm—Cushman, Darby & Cushman

[57] ABSTRACT

A sampling pulse generator receives a plurality of clock signals having the same frequency and phase differences. An additional signal, which may be a clock-run-in signal is also inputted to the generator. Phase relationship data are constructed and assembled and an optimum one of the clock signals is selected and outputted based on the phase data.

8 Claims, 21 Drawing Figures

F I G. 5A (CR1) 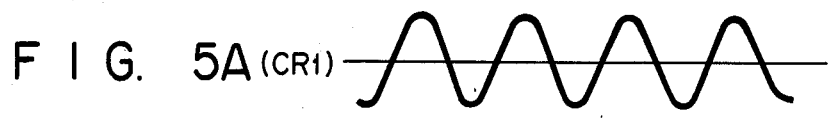
F I G. 5B (CRS) 
F I G. 5C 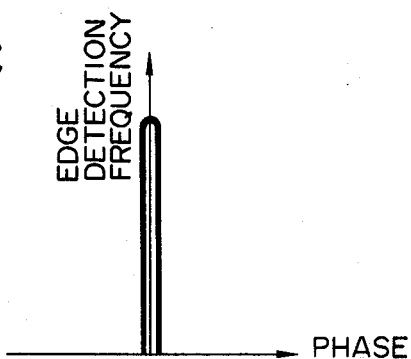
F I G. 6A (CR1) 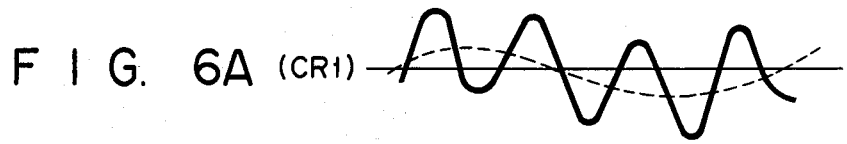
F I G. 6B (CRS) 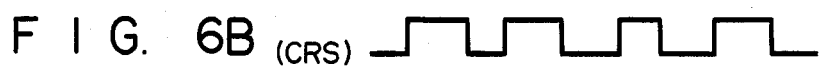
F I G. 6C 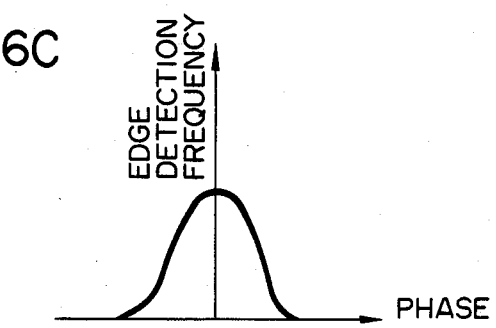

FIG. 7

| A0 A1 A2 A3 A4 A5 A6 A7 | |
|---|---|
| 0 0 0 0 0 0 0 0 | |
| 0 0 0 0 0 0 0 [1] | ~101 |
| 0 0 0 0 0 0 [1] 0 | ~102 |
| 0 0 0 0 0 0 [1] 1 | ~103 |
| 0 0 0 0 0 [1] 0 0 | ~104 |
| 0 0 0 0 0 1 [0] 1 | ~105 |
| 0 0 0 0 0 [1] 1 0 | ~106 |
| 0 0 0 0 0 1 [1] 1 | ~107 |
| 0 0 0 0 [1] 0 0 0 | |
| 0 0 0 0 1 [0] 0 1 | |
| 0 0 0 0 1 [0] 1 0 | |
| 0 0 0 0 1 0 [1] 1 | |
| 0 0 0 0 [1] 1 0 0 | |
| 0 0 0 0 1 [1] 0 1 | |
| 0 0 0 0 1 [1] 1 0 | |
| 0 0 0 0 1 [1] 1 1 | |
| 0 0 0 [1] 0 0 0 0 | |
| 0 0 0 [1] 0 0 0 1 | |
| 0 0 0 1 [0] 0 1 0 | |
| 0 0 0 1 0 0 [1] 1 | |
| 0 0 0 1 [0] 1 0 0 | |
| 0 0 0 1 0 [1] 0 1 | |
| 0 0 0 1 0 [1] 1 0 | |
| 0 0 0 1 0 1 [1] 1 | |

| A0 A1 A2 A3 A4 A5 A6 A7 |
|---|
| 0 0 0 [1] 1 0 0 0 |
| 0 0 0 1 [1] 0 0 1 |
| 0 0 0 1 [1] 0 1 0 |
| 0 0 0 1 1 [0] 1 1 |
| 0 0 0 1 [1] 1 0 0 |
| 0 0 0 1 [1] 1 0 1 |
| 0 0 0 1 [1] 1 1 0 |
| 0 0 0 1 1 [1] 1 1 |
| 0 0 [1] 0 0 0 0 0 |
| [0] 0 1 0 0 0 0 1 |
| 0 0 [1] 0 0 0 1 0 |
| 0 0 1 0 0 0 1 [1] |
| 0 0 1 [0] 0 1 0 0 |
| 0 0 1 0 0 1 [0] 1 |
| 0 0 1 0 0 [1] 1 0 |
| 0 0 1 0 0 1 [1] 1 |
| 0 0 1 [0] 1 0 0 0 |
| 0 0 1 [0] 1 0 0 1 |
| 0 0 1 0 [1] 0 1 0 |
| 0 0 1 0 1 [0] 1 1 |
| 0 0 1 0 [1] 1 0 0 |
| 0 0 1 0 [1] 1 0 1 |
| 0 0 1 0 1 [1] 1 0 |
| 0 0 1 0 1 [1] 1 1 |

FIG. 16

| UPPER (FOR OFFSET) ADDRESS | LOWER ADDRESS | D7 | D6 | D5 | D4 | D3 | D2 | D1 | D0 |
|---|---|---|---|---|---|---|---|---|---|
| 0 | 0 | D7-0 | D6-0 | D5-0 | D4-0 | D3-0 | D2-0 | D1-0 | D0-0 |
| 0 | 1 | D7-1 | D6-1 | D5-1 | D4-1 | D3-1 | D2-1 | D1-1 | D0-1 |
| 0 | 2 | D7-2 | D6-2 | D5-2 | D4-2 | D3-2 | D2-2 | D1-2 | D0-2 |

FIG. 17

| UPPER (FOR OFFSET) ADDRESS | LOWER ADDRESS | D7 | D6 | D5 | D4 | D3 | D2 | D1 | D0 |
|---|---|---|---|---|---|---|---|---|---|
| 1 | 0 | D6-0 | D5-0 | D4-0 | D3-0 | D2-0 | D1-0 | D0-0 | D7-0 |
| 1 | 1 | D6-1 | D5-1 | D4-1 | D3-1 | D2-1 | D1-1 | D0-1 | D7-1 |
| 1 | 2 | D6-2 | D5-2 | D4-2 | D3-2 | D2-2 | D1-2 | D0-2 | D7-2 | ized signal such as a clock-run-in signal contains noises or its
SAMPLING CLOCK PULSE GENERATOR

BACKGROUND OF THE INVENTION

The present invention relates to a sampling clock pulse generator and more particularly to a sampling clock pulse generator as a sampling clock recovery circuit of a receiving system in a character multiplex broadcasting system, for example.

In the recent character multiplex broadcasting system, a clock-run-in signal for synchronizing the sampling of data is sent preceding digital data. A receiver recovers a sampling clock signal exactly synchronized with the incoming clock-run-in signal. For recovering this, a sampling clock pulse recovery circuit is provided in this system.

A transmitter superposes a digital signal for character broadcasting on a part of the horizontal period during a vertical blanking period of a television signal. The receiver samples the digital signal, and stores the sampled ones in a frame memory. In this type of multiplex broadcasting system, a clock-run-in signal (a binary signal of 16 bits as 1010 . . . ) is located at the head of the digital signal for sampling synchronization. This signal is used as a reference phase signal for data sampling. The receiver recovers a sampling clock signal synchronized with the clock-run-in signal, and samples the digital data using the recovered sampling clock signal.

A conventional sampling clock pulse generating circuit will be described. A gate signal is input to a first terminal of the recovery circuit. This gate signal is generated in synchronism with specific phase portions of a clock-run-in signal to be given later. The signal is formed by delaying a horizontal sync signal, for example. A digital signal formed by slicing a picture detected video signal at a predetermined level, is applied to a second terminal of the sampling clock recovery circuit. A clock signal at a much higher frequency than that of a sampling clock signal to be recovered is applied to a third terminal. The gate signal and the clock-run-in signal are input to an AND circuit. The AND circuit generates a reset signal for application to a frequency dividing circuit. The clock signal is frequency divided by the frequency dividing circuit. The signal appears, as a sampling clock signal, at the output terminal of the sampling clock recovery circuit.

Actually, it is a rare case that the clock-run-in signal takes an ideal waveform. An actual clock-run-in signal suffers from noises and a change of the duty ratio, since it is adversely influenced when passing through the transmitter, the transmitting path, and the receiving system. If a gate signal arrives at the AND circuit when the AND circuit receives the portion of the clock-run-in signal suffering from noise or change of the duty ratio, a reset signal is generated at an inappropriate time. The reset signal inappropriately timed is used for resetting the frequency dividing circuit. As a result, the phase relation of the sampling clock signal generated by the frequency divider is disordered. For this reason, the conventional sampling clock recovery circuit frequently recovers an instable sampling clock signal.

In the above example, the clock-run-in signal and the succeeding data are related with each other in a synchronized manner. Accordingly, if a sampling clock signal recovered is exactly synchronized with the clock-run-in signal, the data can exactly be sampled. However, the sampling phase obtained on the basis of the clock-run-in signal is not necessarily appropriate to the sampling of the data since it consists of a series of successive spectrums, not a single sinusoidal wave and is influenced by the crowd delay characteristic in the transmission line. In other words, the frequency components of the data have different propagation times, respectively, possibly resulting in a waveform distortion of the data signal.

Thus, when the data is sampled at inappropriate phases, data can incorrectly be recognized.

SUMMARY OF THE INVENTION

It is, therefore, an object of the present invention to provide a new and improved sampling clock pulse generator in which even if a data sampling synchronizing signal such as a clock-run-in signal contains noises or its duty ratio is changed, a sampling clock pulse with a correct sampling phase can be generated.

It is another object of the present invention to provide a sampling clock pulse generator to simplify the generation of a stable sampling clock pulse.

It is still another object of the present invention to provide a sampling clock pulse generator which is synchronized not only with a clock-run-in signal as a reference for data sampling, but also directly with incoming data.

According to the present invention, a sampling clock pulse generator for sampling a data signal which is transmitted subsequently to a clock-run-in signal, the clock pulse generator comprising detection means being responsive to the clock-run-in signal and a plurality of clock signals for detecting a specific phase portion of the clock-run-in signal, the detection means generating a first output when the phase portion is detected, counter means for counting the first output for a given period, the counter means generating a second output corresponding to the content thereof, and selector means coupled to the counter means for selecting one of the clock signals as the sampling clock pulse according to the second output.

BRIEF DESCRIPTION OF THE DRAWINGS

These and other objects and features of the present invention can be understood by reference to the accompanying drawings, in which:

FIGS. 5A to 5C show waveforms for illustrating the effect obtained by the circuit of FIG. 3;

FIGS. 6A to 6C show waveforms for illustrating the effect of this circuit;

FIG. 7 shows a data conversion table in an optimum phase selector shown in FIGS. 1 and 3;

FIGS. 16 and 17 show tables of relationships of output data against the input address of the circuit of FIG. 13.

DETAILED DESCRIPTION OF THE PREFERRED EMBODIMENTS

In a first embodiment of the present invention, a clock-run-in signal is sampled by a plurality of reference clock signals with phases different from each other. Specific phase portions of the clock-run-in signal during a gate signal period, for example, a distribution of the edges in the waveform of the signal, are detected. The result of the detection is used for determining an optimum phase of a sampling clock signal to be recovered. More specifically, the edges of the clock-run-in signal waveform are detected by an edge detector, using the result of edge detection. A distribution of the edges is obtained by a combination of a parallel counter section and a threshold level comparator. By the signal (data) representing the edge distribution, a clock signal to be selected by an optimum phase selector is detected to control a clock selector.

Figure 1:
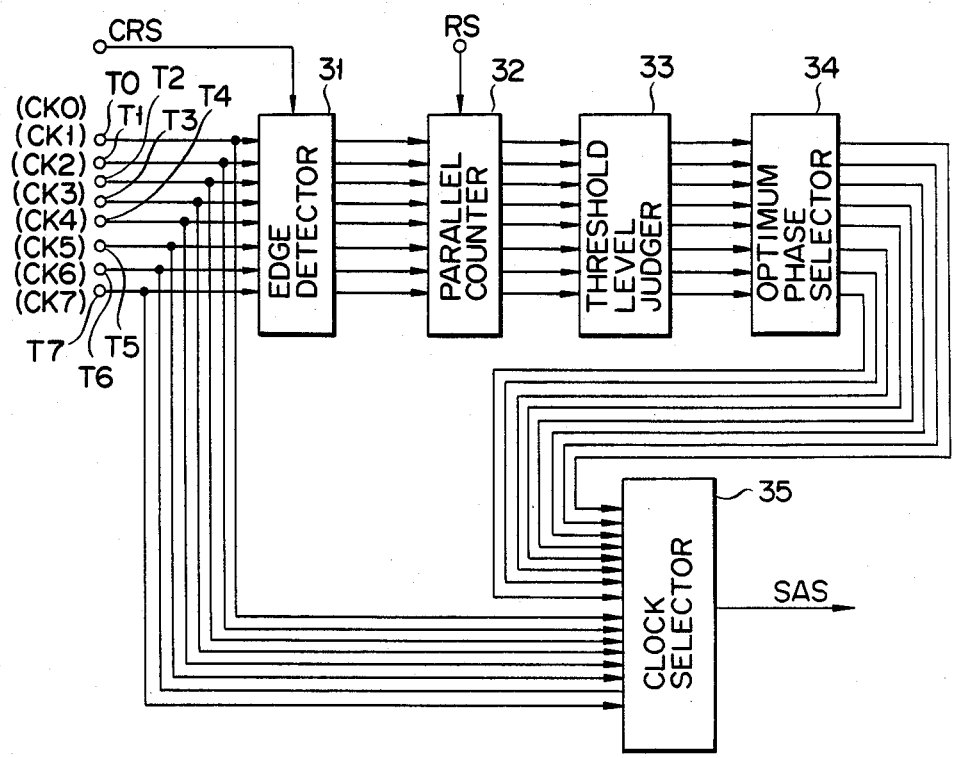
FIG. 1 is a block diagram showing a first embodiment of the present invention.
Figure 2:
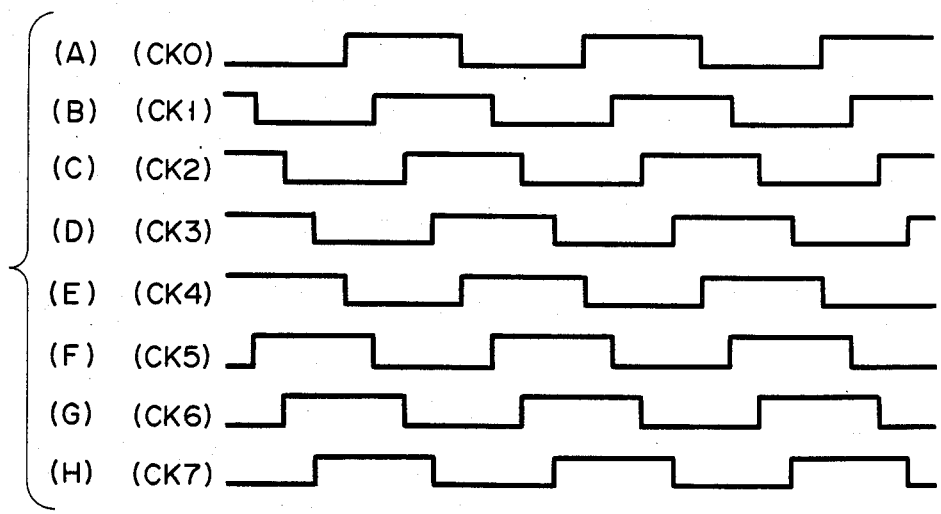
FIG. 2 shows waveforms of clock signals applied to the circuit of FIG. 1.

The preferred embodiment will be described referring to the accompanying drawings. In FIG. 1, eight clock signals CK0–CK7 are applied to eight terminals T0–T7, respectively. Before being applied to the terminals, the clock signals are phase shifted by predetermined phases from one another by a 8/5 fsc (fsc:color subcarrier frequency) oscillator (not shown) and a delay pulse generator (not shown). The frequency of each clock signal CK0–CK7 is equal to that of a sampling clock signal. These clock signal are applied to an edge detector 31 for detecting edges of a clock-run-in signal (4/5 fsc) and also to a clock selector 35. The clock selector 35 selects one of the clock signals CK0–CK7 on the basis of the data from an optimum phase selector 34. The data represents the decision on the optimum phase selection. The selected clock signal is output as a sampling clock signal SAS to be recovered. A clock-run-in signal CRS is also applied to the edge circuit 31. The clock-run-in signal is a digital signal formed by slicing a detected video signal at a predetermined level. The edges of the clock-run-in signal CRS appear, at the corresponding output terminals of the edge detector 31, in the form of "1" (logical high) or "0" (logical low) when the clock-run-in signal CRS is sampled by the clock signals CK0–CK7 with different phases.

As the sampling operation is repeated several times, the counters forming a parallel counter 32 detect the edges of signal CRS. The more frequently each detector detects the edges of signal CRS, the greater count values it has. As will be described later, in the parallel counter section 32, the counters are connected to the output terminals of the edge detector 31, respectively. The output signals of the counters of the parallel counter section 32 are applied to a threshold level judger 33. The judger 33 judges as to whether or not the counted value of the counters exceeds a threshold level. From the judge result, it can be seen how the edges of the clock-run-in signal CRS are distributed. The parallel counter section 32 is reset by a reset pulse RS synchronized with the clock-run-in signal. The distribution data output from the threshold level judger 33 is applied to the optimum phase selector 34 constructed with a read only memory (ROM), for example. According to the distribution data, the selector 34 outputs select data to select an incoming sampling clock signal which may have an optimum phase, and applies it to the clock selector 35.

Figure 3:
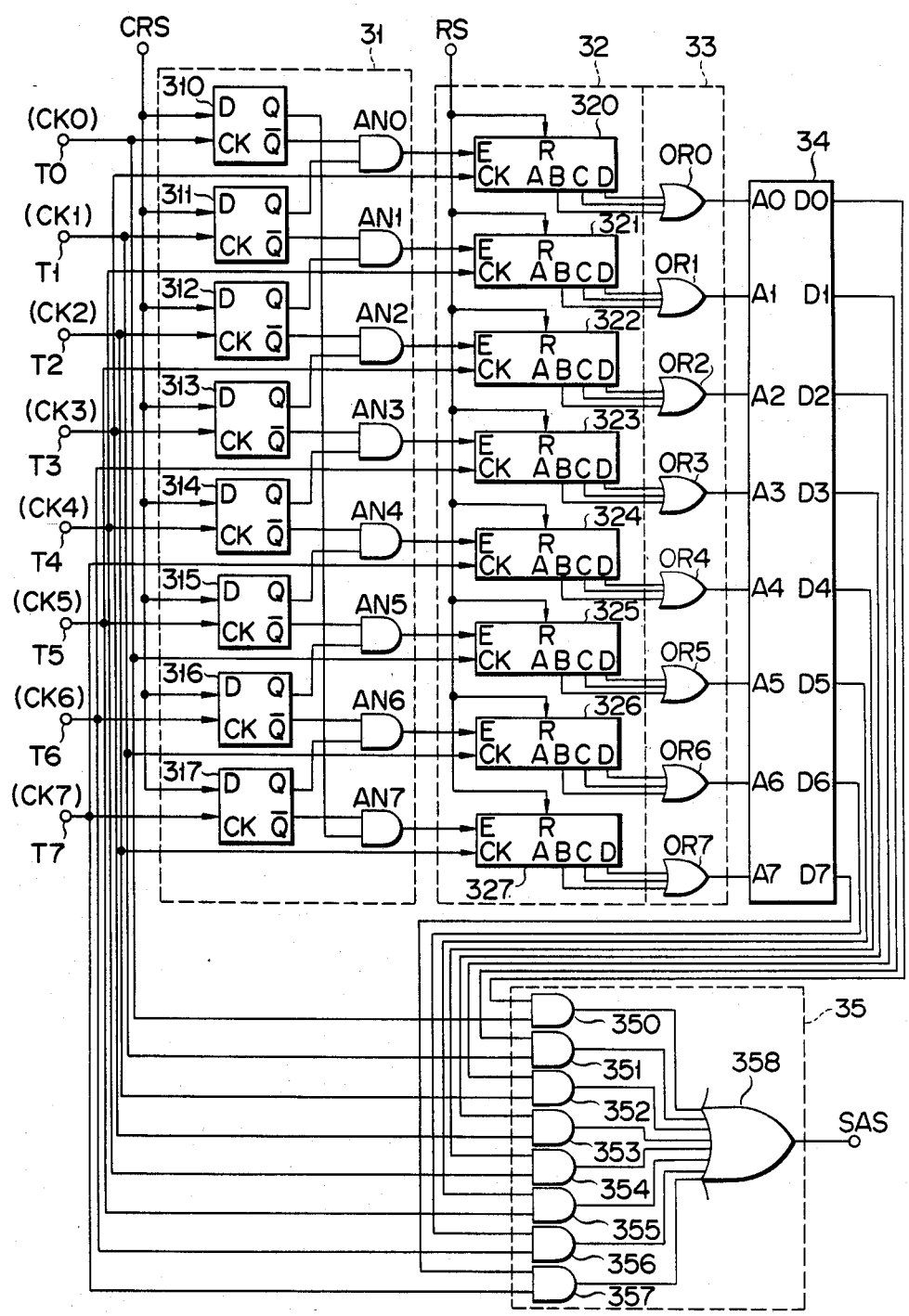
FIG. 3 is a circuit diagram illustrating the details of the circuit of FIG. 1.

FIG. 3 shows in detail the circuit shown in FIG. 1. Like symbols are used for designating like portions in FIG. 1. The edge detector 31 is comprised of eight D-type flip-flops 310–317 and eight AND circuits AN0–AN7. The eight clock signals CK0–CK7 are applied to the clock terminals CK of the flip-flops 310–317, respectively. These clock pulses are formed by dividing the duration of one period of the clock-run-in signal into eight segments. The clock-run-in signal CRS is applied to the data input terminals of the flip-flops 310–317. The AND circuits AN0–AN7 are wired so as to logically sum the signals output from the inverting terminals $\bar{Q}$ and the noninverting terminals Q of the adjacent D type flip-flops, as shown. Each AND circuit detects the leading edge of the clock-run-in signal.

Figure 4:
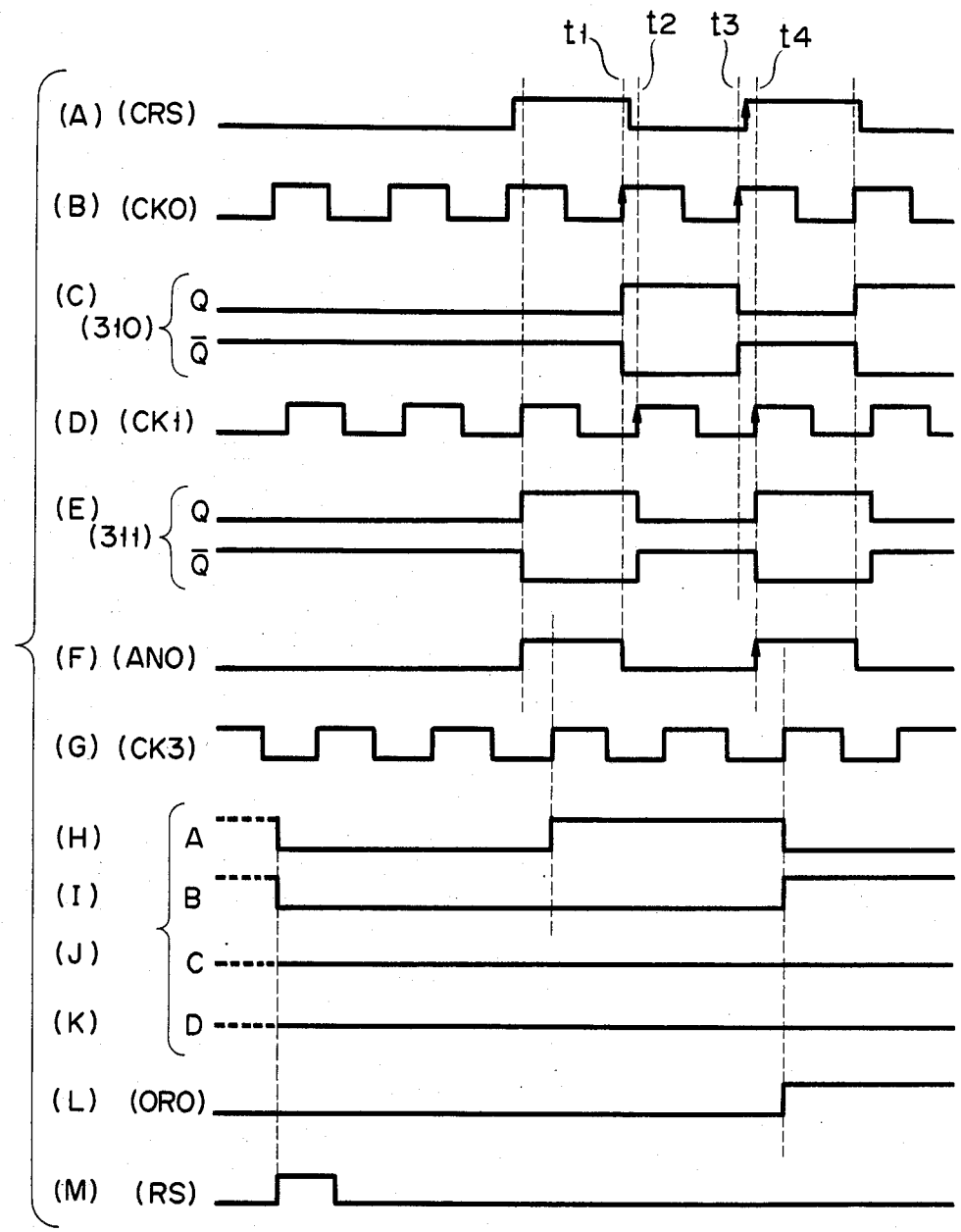
FIGS. 4A to 4M show waveforms of signals at key portions in the circuit of FIG. 3.

FIGS. 4A–4M show waveforms of the signals output from the flip-flops 310 and 311, and the AND circuit AN0, and the signals associated with the above output signals. As shown in FIG. 4A, the time interval from time t1 to t2 contains the trailing edge of the clock-run-in signal CRS. At time t1, the output signal of the AND circuit 310 is sampled by the clock CK0 of FIG. 4B (FIG. 4C). At time t2, the output signal from the flip-flop 311 is sampled by the clock signal CK1 of FIG. 4D (FIG. 4E). The inputs of the AND circuit AN0 are both "0", so that its output signal is also 0, as shown in FIG. 4F. During the time interval from time t3 to t4 containing the leading edge of the clock-run-in signal CRS (FIG. 4A), at time t3 the output signal of the flip-flop circuit 310 is sampled by the clock signal CK0 of FIG. 4B (FIG. 4c). At time t4, the output signal of the flip-flop 311 is sampled (FIG. 4E). By this sampling, the input signals to the AND circuit AN0 are both "1" and hence its output signal is also "1" (FIG. 4F). Thus, every time the leading edge of the clock-run-in signal CRS is detected, each of the AND circuits AN0–AN7 produces a "1" or high level signal. The output signals from the AND circuits AN0–AN7 are respectively input to the enable terminals E of the counters 320 to 327 cooperatively forming the parallel counter section 32. These counters 320–327 have been reset by a reset pulse RS, which is applied to the reset terminals R of the counters in synchronism with the clock-run-in signal CRS. When the enable terminals E of the counters are "1" in logical level, the counters count respectively the clock signals CK0–CK7 applied to the clock terminals CK. Of course, these clock signals are applied to have relations enough to allow the counters to count up. For the counter 320, for example, a clock signal CK3 as shown in FIG. 4G is used.

In a counter having a high frequency of edge detection, its count reaches a predetermined value. This is detected by an OR circuit of those OR0–OR7, which form the threshold level judger 33. FIG. 4H–4K show waveforms of the signals at the output terminals A–D of the counter 320 when the counter counts two clocks CK3. The threshold level of each counter 320–327 is set by the OR circuits OR0–OR7, and set to two clocks in this embodiment. Therefore, the whole outputs of the OR circuits OR0–OR7 equivalently show a phase distribution of the edges of the clock-run-in signal. FIG. 4L shows a output of the OR circuit OR0. FIG. 4M shows a waveform of a reset pulse to reset the counters 320–327.

The output signals from the OR circuits OR0–OR7 are respectively input to the input terminals A0–A7 of the optimum phase selector 34. The selector 34 converts the input data into select data according to the contents of a data conversion table as previously set up. In this case, the input data is converted such that any one of the bits D0–D7 of the select data is "1" and the remaining ones are all "0". The bits D0–D7 of the select data are respectively connected to first input terminals of AND circuits 350–357 forming the clock selector 35. The clocks CK0–CK7 are input to the second input terminals of the AND circuits 350–357, respectively. Accordingly, one clock of those clocks CK0–CK7 located at a phase as specified by the select data is derived through the OR circuit 358, as a sampling clock signal SAS to be recovered.

How the data conversion table is set up in the optimum phase selector 34 will be described. FIG. 5A and 5B show waveforms of a noiseless received clock-run-in signal CR1 and an actually used clock-run-in signal CRS after it is passed through the slice circuit. When such an ideal clock-run-in signal is received, the phases of the edges of the clock-run-in signal are distributed concentrated at a fixed phase portions or point, as shown in FIG. 5C. FIGS. 6A and 6B show waveforms of the incoming clock signal CR1 and the actually used clock-run-in signal CRS when the signal CR1 is distorted by a low frequency wave as indicated by a dotted line. In this case, a duty ratio of the waveshaped clock-run-in signal CRS is not fixed at 50%, and the phases of the detected edges vary as shown in FIG. 6C. In this case, a plurality of OR circuits OR0–OR7 detect the incoming signals exceeding the threshold level, and output signals. The optimum phase selector 34 generates select data according to the data conversion table as shown in FIG. 7.

FIG. 7 tabulates the edge phase distribution data consisting of bits A0 to A7 at the corresponding input terminals of the optimum phase selector 34. When the edge phase distribution data "1" is concentrated at a point, as indicated by 101, 102 and 104, it is sufficient that the select data is set up so as to select the sampling clocks at the phase points enclosed by square marks. In the case of 103 and 106, the edges are detected a few times at two different phase points. These phase points are very close to each other, however. Therefore, either of the phase points may be selected as an optimum phase point. When the phases of the detected edges are widely distributed as in the case of 105 and 107, it is preferable to set up the select data so as to select the mid point between the phase points of the detected edges. With selection of the mid point, the optimum phase point will be obtained at a high probability, from a statistical view point. In the above-mentioned embodiment, the edges of the clock-run-in signal are selected for obtaining the optimum phase portion. In place of the edges, other specific phase portions of the clock-run-in signal may be selected for the same purpose. In this alternative case, it is sufficient to appropriately change the logical states of the signals related.

As seen from the foregoing description, the edges of the clock-run-in signal are detected at a plurality of phase points to obtain phase distribution data. For obtaining the optimum phase point, the phase points with a high frequency of the edge detection are searched. The phase distribution data, not the phase point with the highest frequency of the edge detection, is used for determining the optimum phase point. Therefore, the selection of the optimum phase point is insensitive to periodical noise. Even if the clock-run-in signal is influenced by various types of noises, the recovery performance of the clock signal by this embodiment is superior to that by the conventional circuit.

The second embodiment of a sampling clock pulse generator according to the present invention will be described. In the second embodiment, the circuit arrangement and the procedure to determine an optimum phase of a sampling clock signal to be recovered are substantially the same as those of the first embodiment. A feature of this embodiment distinguished from the first embodiment resides in that the select data obtained is applied to the clock selector after it is passed through a select data protecting circuit with a sort of hysteresis function. According to this feature, if the optimum phase is mistakenly selected, the sampling phase is never changed immediately following that selection. Therefore, a stable sampling clock pulse can easily be generated.

Figure 8:
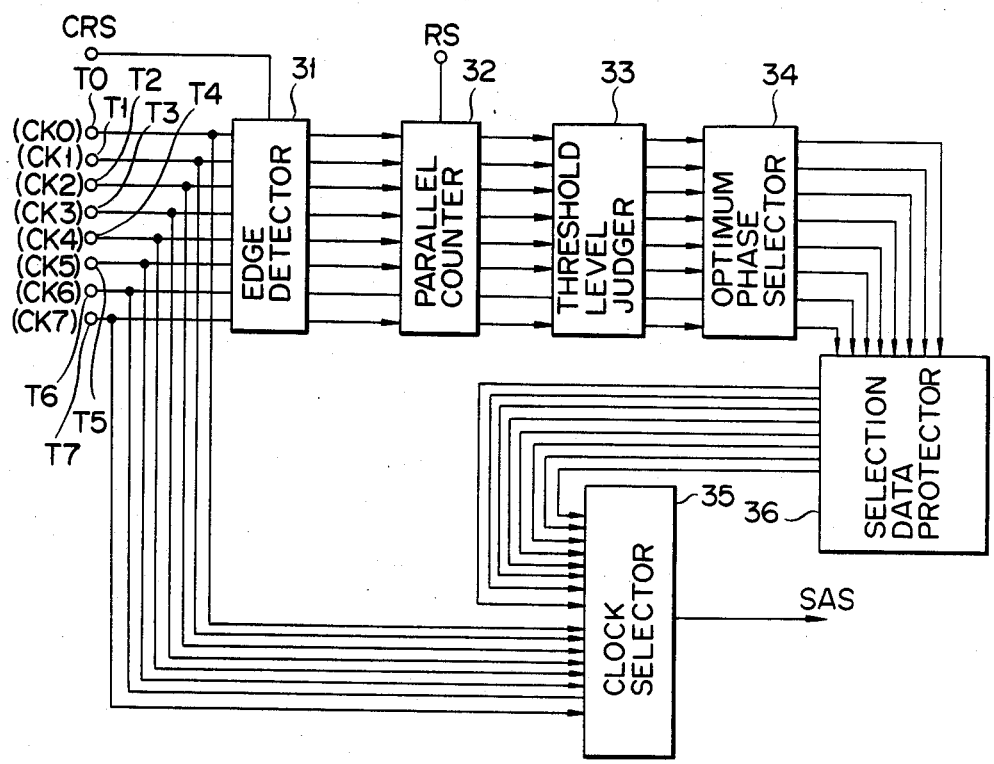
FIG. 8 shows a block diagram illustrating a second embodiment of the present invention.

How to implement this feature will be described in detail. Like symbols are used to designate like or equivalent portions in the first embodiment, for simplicity. As shown in FIG. 8, this embodiment additionally employs a select data protector 36 inserted between the optimum phase selector 34 and the clock selector 35. The protector has a sort of hysteresis function. Description of the second embodiment will be given placing an emphasis on the select data protector and its related circuitry.

Figure 9:
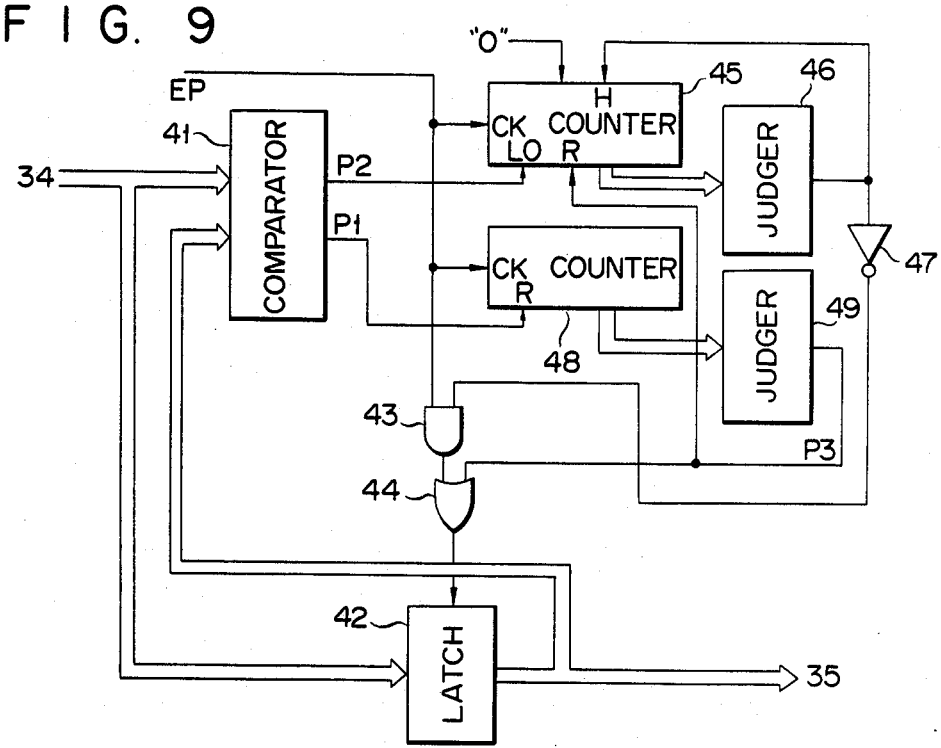
FIG. 9 shows a circuit diagram illustrating the details of a select data protecting circuit shown in FIG. 8.
Figure 10:
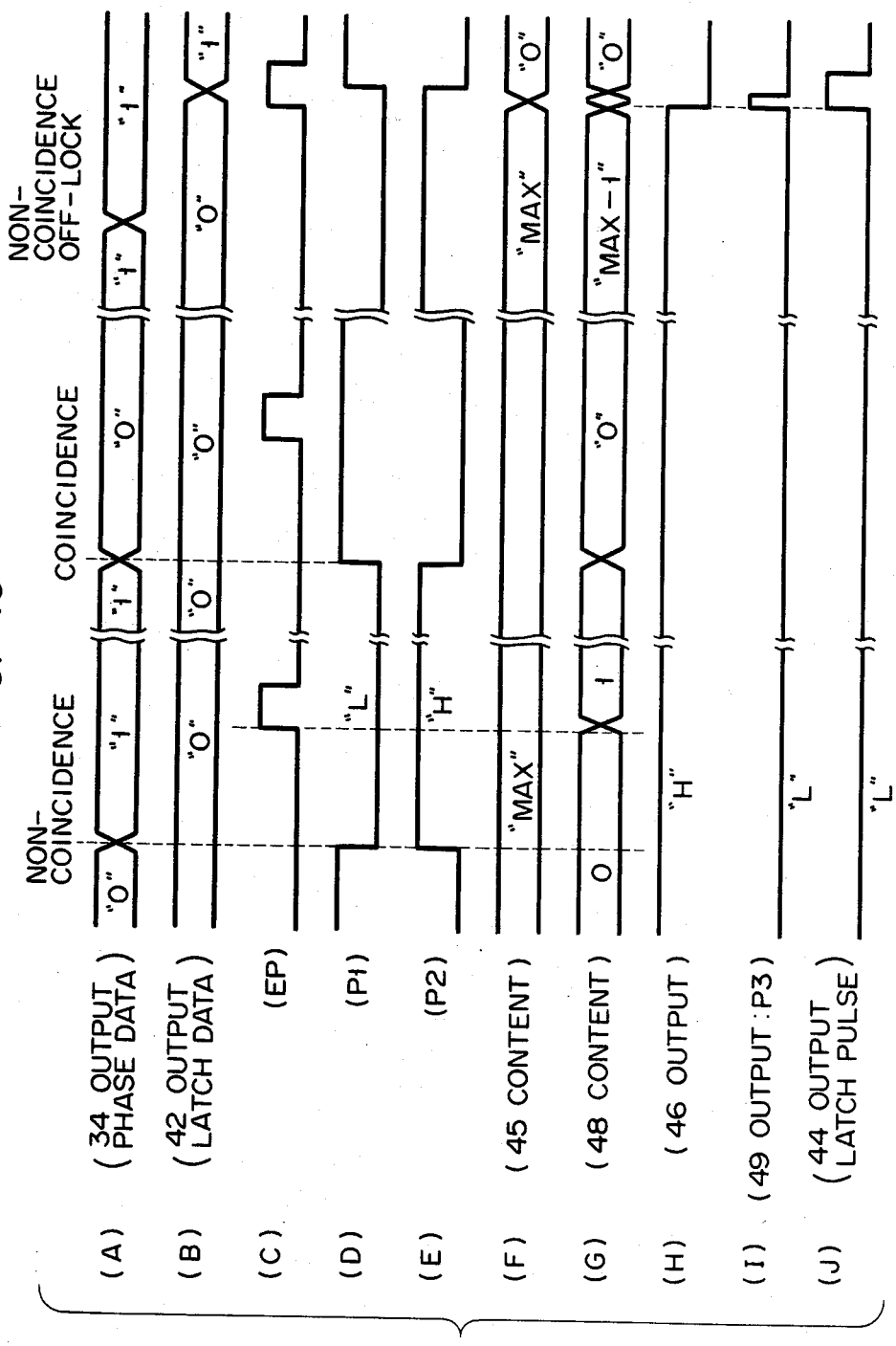
FIG. 10A to 10J show timing charts for illustrating the operation of the protecting circuit shown in FIG. 9.

FIG. 9 illustrates the details of the select data protector. FIG., 10A to 10J illustrate the operation of the select data protector shown in FIG. 9. The select data from the optimum phase selector 34 is applied to a comparator 41 and a phase data latch circuit 42. The comparator 41 compares the select data from the optimum phase selector 34 and the actual select data from the latch circuit 42. The optimum phase selector 34 produces a coincident pulse P1 or a noncoincident pulse P2 on the basis of the result of the comparison. The coincidence pulse P1 is applied to the reset terminal R of a first counter 48. The noncoincident pulse P2 is applied to the load terminal LO of a second counter 45. The counter 48, which is connected at the clock input terminal CK to a detection end pulse EP to be given later, continues the counting of the pulse EP, if it is not reset. The end pulse EP is produced from the optimum phase selector 34, for example, when the check of a phase distribution of the clock-run-in signal is completed. When the counted value of the first counter 48 exceeds a predetermined value, it is detected by a first check circuit 49. The first counter 48 and the first check circuit 49 measures the number that the input select data and the latch data in the latch circuit 42 are not coincident with each other. When the noncoincident number exceeds a predetermined number, the check circuit 49 produces an updating pulse P3 for updating the latch data. The pulse P3 is applied to the latch pulse input terminal of the latch circuit 42, and also to the reset terminal R of the second counter 45. Accordingly, so long as the coincident pulse P1 is present, the updating pulse is not produced. When the non-coincidence of the select data with the latch data occurs a predetermined number of times or more, the updating pulse P3 is produced to update the latch data. On the other hand, the noncoincident pulse P2 is applied to the load terminal LO of the second counter 45. The application of the pulse P2 is made immediately after it is reset by the updating pulse P3. When the output signal of a second check circuit 46 is "1", it is supplied to the hold terminal H of the counter 45. Under this condition, the counter 45 rejects the detection end pulse EP supplied to the clock terminal CK. When the second counter 45 is loaded with the noncoincident pulse P2 immediately after it is reset, all "0" is set in the counter 45. Accordingly, when the noncoincident pulse P2 is produced, the output of the first stage, for example, of the counter 45 is "0". This is detected by the second check circuit 46. The signal representing the check result from the check circuit 46 is applied at a high level to an AND circuit 43, by way of an inverter 47. Accordingly, the end pulse EP is applied as an updating pulse to the latch circuit 42, through the AND circuit 43 and the OR circuit 44. Therefore, so long as the noncoincident pulse P2 is present, the AND circuit 43 is conductive. Under this condition, the latch data is updated by the end pulse EP. When the coincident pulse P1 is produced following the noncoincident pulse P2, the second counter 45 starts the counting of the end pulse EP. Then, the check circuit 46 is at a high level to hold the second counter 45. The AND circuit 43 is locked by the output signal of the inverter 47. Consequently, the data obtained when the coincident pulse P1 is produced is latched in the latch circuit 42.

Next, let us consider a situation that the noncoincident pulse P2 is produced when the coincident pulse P1 is continuously present. In this situation, the second counter 45 is in a hold state, and the AND circuit 43 holds a nonconductive state. The second counter 45 holds this state till the first counter 48 counts a predetermined number of clock signals (detect end pulse EP). When the updating pulse P3 is produced, the counter 45 is reset to allow the data in the latch circuit 42 to be updated. When only the coincident pulse P1 is present, even if the noncoincident pulse is produced one or two times, the latch data is never updated as a quick response to such a noncoincident pulse. As seen from the foregoing description, the select data protector has a sort of hysteresis function. With this function, the protector can cope with a sudden change in the select data, i.e., a wrong operation of the circuit, to eliminate instability of the phase select data and to secure further, stable, actual select data. In operation, the terminals of the second counter 45 are priority ordered; the highest priority is assigned to the reset terminal R, the medium priority to the hold terminal H and the lowest priority to the load terminal LO. FIGS. 10A to 10J show timing charts for illustrating the on-lock and off-lock operations as mentioned above.

Figure 11:
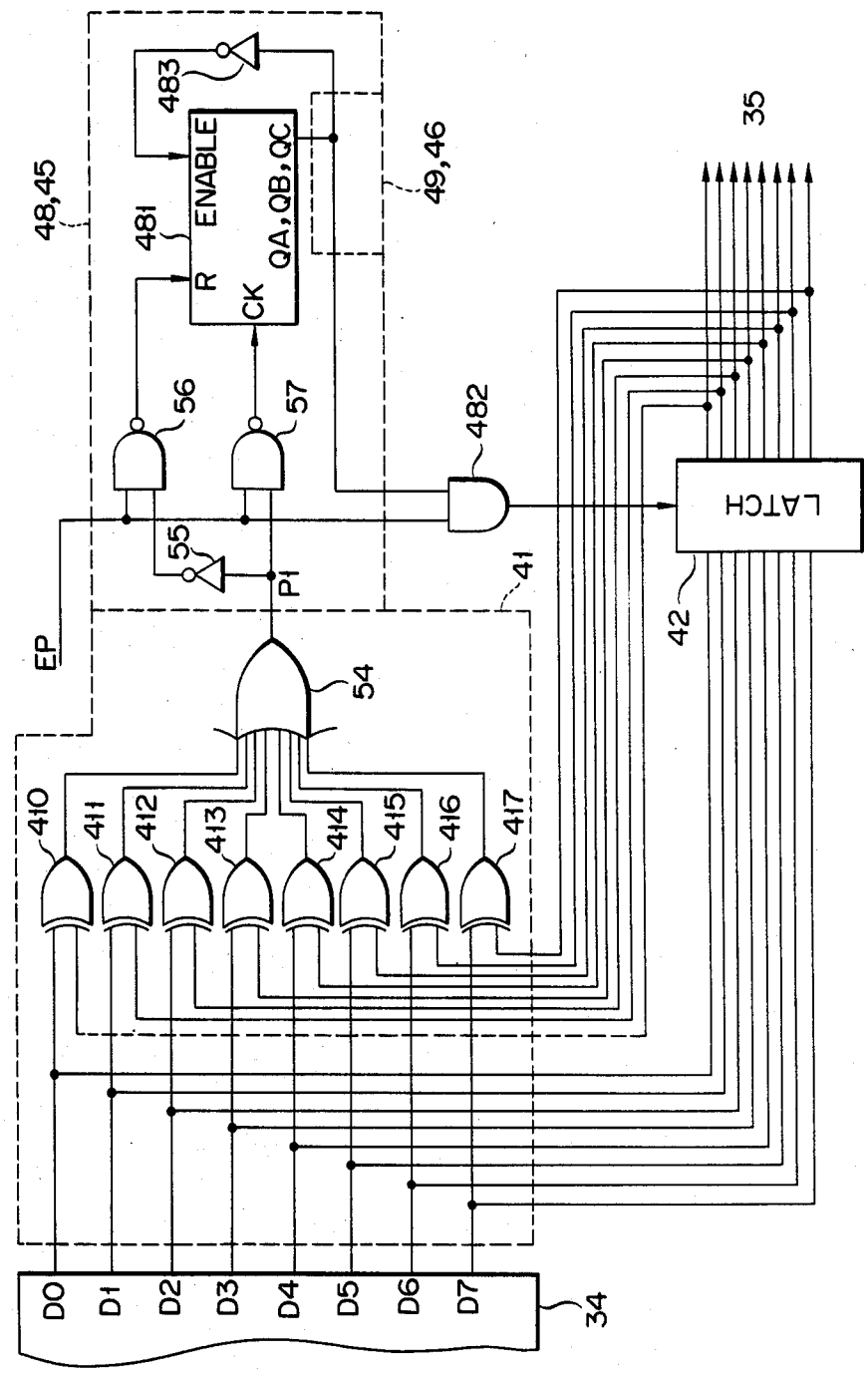
FIG. 11 is a circuit diagram illustrating the details of a comparator and a counter in the second embodiment.

Turning now to FIG. 11, there is shown a circuit arrangement including the comparator 41, the counters 45 and 48, and the check circuits 46 and 49 in the circuit of FIG. 9. Also in this figure, the same reference numbers designate the same or equivalent portions in the circuit of FIG. 9.

The comparator 41 is comprised of eight exclusive OR circuits 410–417, and an OR circuit 54. When the select data consisting of eight bits D0-D7 from the optimum phase selector 34 are completely coincident with that from the latch circuit 42, the comparator 41 produces a coincident pulse P1 with negative polarity. This pulse P1 is applied to one of the input terminals of a NAND circuit 56, through an inverter 55. With this connection, the detection end pulse EP is allowed to reach the reset terminal R (negative logic) of a counter 481, by way of the NAND circuit 56 when it is appropriately conditioned. The counter 481 is used for both the counters 45 and 48. When the coincident pulse P1 is not present, one of the input terminals $\overline{R}$ of a NAND circuit 57 is in a high level. Then, if the end pulse EP arrives at the NAND circuit 57, the NAND circuit 57 produces an output signal, which in turn is applied as a clock signal to the counter 481. When the inputting of the clock signal to the counter 481 continues for a predetermined time duration, the counter 481 produces a high level signal at the output terminal of the third stage, for example. The high level signal is applied through the portion corresponding to the comparator 46 (49) to the AND circuit 482, which in turn is enabled. Through the sequence of operation, the updating pulse based on the end pulse EP is allowed to enter the latch circuit 42. The output signal from the counter 481 is further applied to the enable terminal ENABLE of the counter 481, via the comparator portion and an inverter 483. This state is kept till the coincident pulse P1 next appears. In other words, when the coincident pulse P1 is present, the updating operation of the data in the latch circuit 42 is repeated till the next coincident pulse appears.

As seen from the foregoing description, in the second embodiment, the select data protector has a hysteresis function. When the optimum phase select data is detected, an unintentional change of the select data can be prevented by this function. Therefore, a stable sampling clock pulse can be generated.

A third embodiment of a sampling clock pulse generator according to the present invention will be described. The present embodiment is comprised of a first means for checking an optimum phase of a clock-run-in signal, a second means for checking the optimum phase of the data succeeding to the clock-run-in signal, and a means for detecting a difference between the optimum phases as checked by the first and second means and detecting the offset data representing the difference a plurality of times, calculating a mean value of the detected offset data, and for storing the mean offset data. In the succeeding check of the optimum phase of the sampling clock pulse, the mean offset data and the check result data from the first means are composed. The composite data is used in the succeeding check of the optimum phase of the sampling clock pulse. With this arrangement, a sampling clock pulse with an optimum phase for the data actually sampled can be attained.

Figure 12:
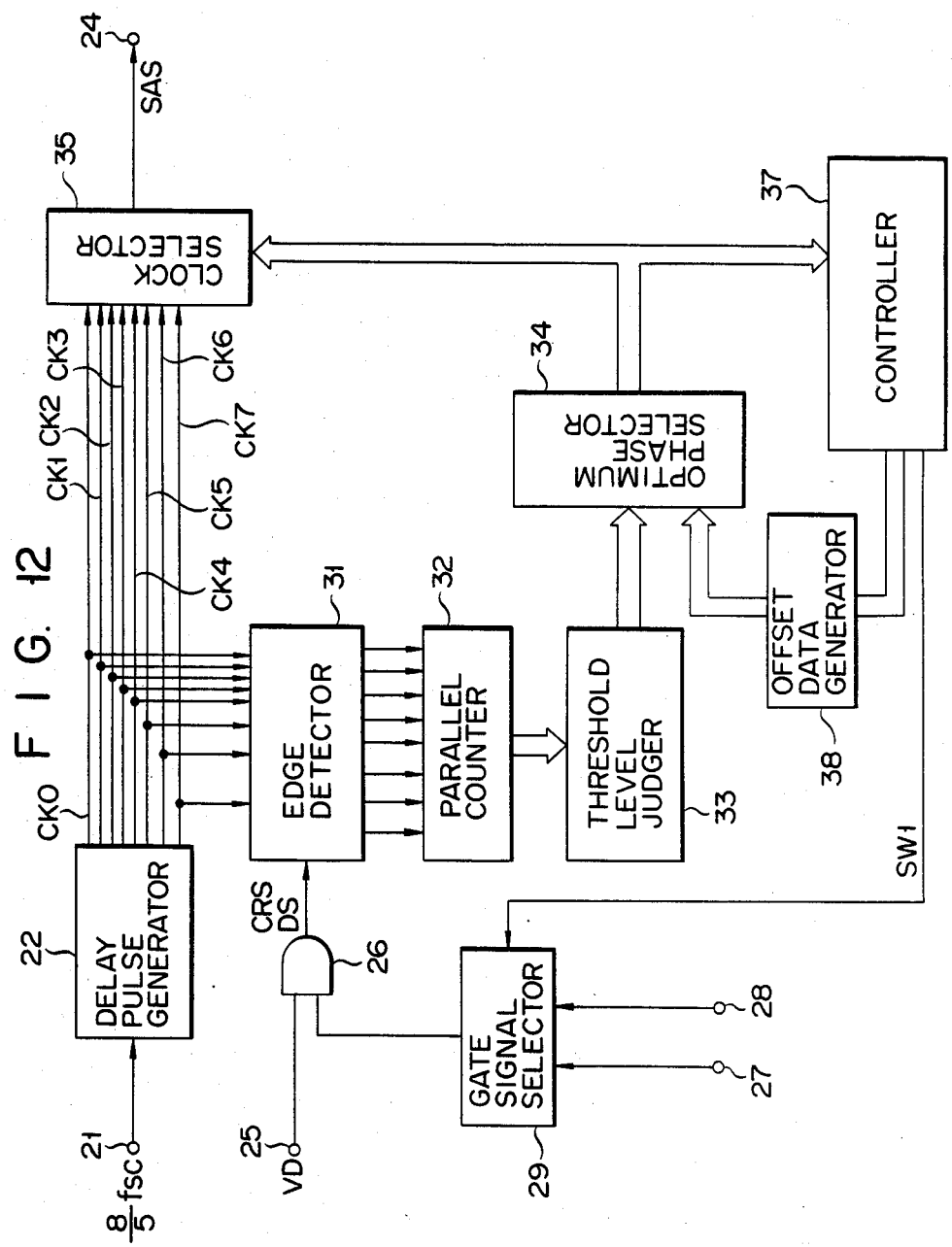
FIG. 12 is a circuit diagram of a third embodiment of the present invention.

The third embodiment will be described in detail referring to the accompanying drawings. In FIG. 12, a signal at 8/5 fsc (fsc:color subcarrier frequency) is applied from an oscillator (not shown) to an input terminal 21. This signal is then applied to a delay pulse generator 22. The pulse generator 22 converts the signal into a plurality of clock signals (in this embodiment, eight clock signals) CK0-CK7 with different phases. These clock signals are input to a clock selector 35 to be used as a data selector, which is similar to that of the first embodiment. The clock selector 35 selects any one of the clock signals, and produces it as a sampling clock signal SAS at an output terminal 24. The clock selector 35 is controlled by the third select data derived from the optimum phase selector 34 similar to that in the first embodiment, and determines a select clock.

A digital signal VD formed by slicing the video signal containing a character multiplex signal is input to a terminal 25 connected to an AND circuit 26. A gate pulse is input from a gate signal selector 29 to the AND circuit 26. A gate pulse for the clock-run-in signal is input to the terminal 27 of the gate signal selector 29. A gate pulse for the succeeding data is input to the terminal 28 of the selector 29. With this connection, the AND circuit 26 produces a received clock signal CRS or the succeeding data DS. The output signal from the AND gate 26 is input to an edge detector 31 similar to that of the first embodiment. Applied to the edge detector 31 are the clock signals CK0-CK7 as sampling clock signals to be recovered. The edge detector 31 samples specific phase positions or the point of the clock-run-in signal CRS by the clock signals CK0-CK7. The edge selector 31 with such a function is composed of D-type flip-flops, for example. These flip-flops are arrayed in a time-axis direction, and the number of them is equal to that of the clock signals. In operation, the output signals from the inverting terminal of one flip-flop and the noninverting terminal of another flip-flop adjacent to the former are ANDed to form an edge detect pulse. The arrangement of this circuit is substantially the same as that of the first embodiment shown in FIG. 3.

The output terminals of the edge detector 31 are respectively connected to the input terminals of a parallel counter 32 to be an edge counter, which is similar to that of the first embodiment. In the parallel counter 32, the edge detect pulses are progressively counted by counters provided at the specific phase portions, phase distribution data can be obtained, which is depicted on the coordinates with the ordinate representing a frequency of edge detection and the abscissa representing the phase portion. The phase distribution data is obtained by a threshold level judger 33 similar to that of the first embodiment. The phase distribution data from the threshold level judger 33 is input to an optimum phase selector 34. The optimum phase selector 34 produces select data according to the input phase distribution data. The optimum phase selector 34 previously stores the select data in the form of table data according to the contents of the phase distribution data. The select data is used as select control data for the data selector 23, and is input to the controller 37.

The controller 37 includes a timing pulse generator for controlling timings of the operation of this sampling pulse recovery circuit, a memory, an arithmetic unit, etc. The controller produces timing pulses in synchronism with the sync signal of the character multiplex receiver. It also produces a select signal SW1 for the gate signal selector 29.

Particularly, the controller 37 is designed so as to obtain a difference between first select data to select the optimum phase of the clock-run-in signal and second select data to select the optimum phase of the succeeding data. The offset data is measured many times and a mean value of the data is calculated. Each piece of offset data is obtained for each vertical blanking period, viz. every time a character multiplex signal is periodically input. The controller 37 measures the offset data ten to twenty times, for example, and calculates a mean value of those pieces of data. The mean offset data thus calculated is then stored in an offset data generator 38. In the optimum phase selector 34, when the optimum phase of the clock-run-in signal is checked, the mean offset data from the offset generator 38 is added to or subtracted from the phase distribution data from the threshold level judger 33, thereby to table convert the select data. If the edge phase distribution on the clock-run-in signal is detected after this processing, the optimum phase distribution data for the succeeding data is modified by the mean offset data, to obtain the select data with the optimum data for sampling the succeeding data.

Figure 13:
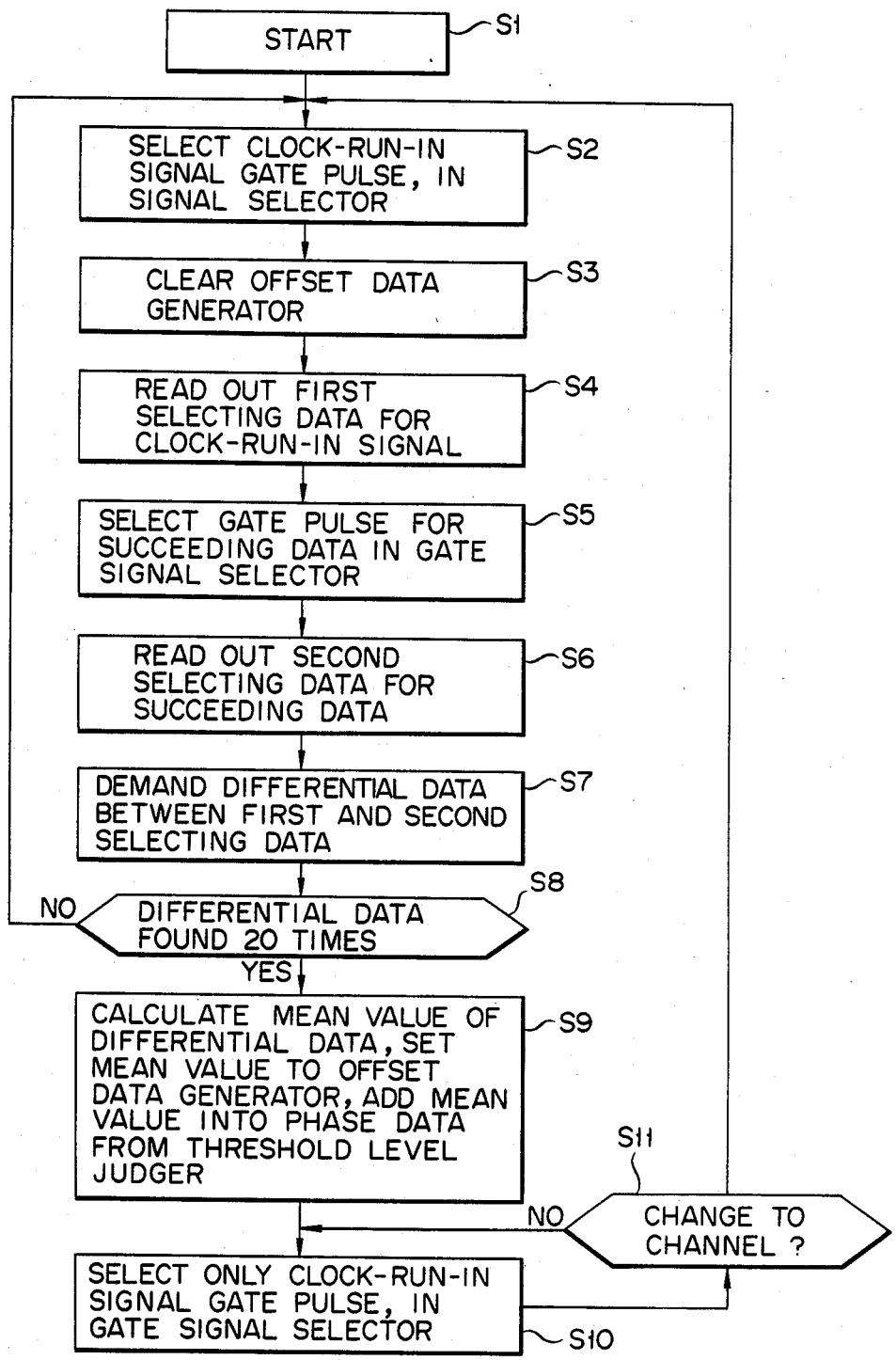
FIG. 13 shows a flowchart for illustrating the operation of the third embodiment shown in FIG. 12.

FIG. 13 shows a flowchart illustrating a sequence of procedural operations in the controller 37. At step S1, the controller 37 starts its operation. At step S2, the gate signal selector 29 is caused to select a gate pulse for the clock-run-in signal. In step S3, with the selected gate pulse, the offset data generator 38 is cleared. Then, the first optimum phase select data on the clock-run-in signal is obtained. The select data is read out in step S4. In step S5, the gate signal selector 29 is controlled to select the succeeding data gate pulse. Subsequently, the second optimum select data on the succeeding data is obtained in this step, and read out in step S6. In step S7, a difference between the first optimum phase select data and the second optimum phase select data is obtained.

In step S8, it is checked whether or not the above processing is performed 20 times (corresponding to 20 packets). If it is performed below 20 times, that is, less than 20 pieces of offset data are obtained, step S2 is executed again. On the other hand, if 20 pieces of difference data are obtained, the next step S9 is executed. In step S9, these pieces of data are calculated to have a mean value of them. The mean offset data is set in the offset data generator 38, and is added to the phase distribution data from the threshold level judger 33. In step S10, the gate signal selector 29 is caused to select only the clock-run-in signal.

Through the above sequence of the steps, the first optimum phase select data on the clock-run-in signal is corrected to be the optimum phase data for sampling the succeeding data, and input to the data selector 23. The mean offset data as once obtained is continuously effective for the successive correcting operations, so long as one channel is received. The reason for this is that a signal propagating characteristic from one station to the receiver is fixed and hence a difference between the optimum sampling phase of the clock-run-in signal and that of the succeeding data is fixed. When the channel received is switched to another, the signal propagating characteristic for the new channel may be different from the former. In such a case, in step S11, it is checked whether or not a new channel is selected. If the check result is YES, the operation returns to step S2 to obtain the mean offset data again.

Figure 14:
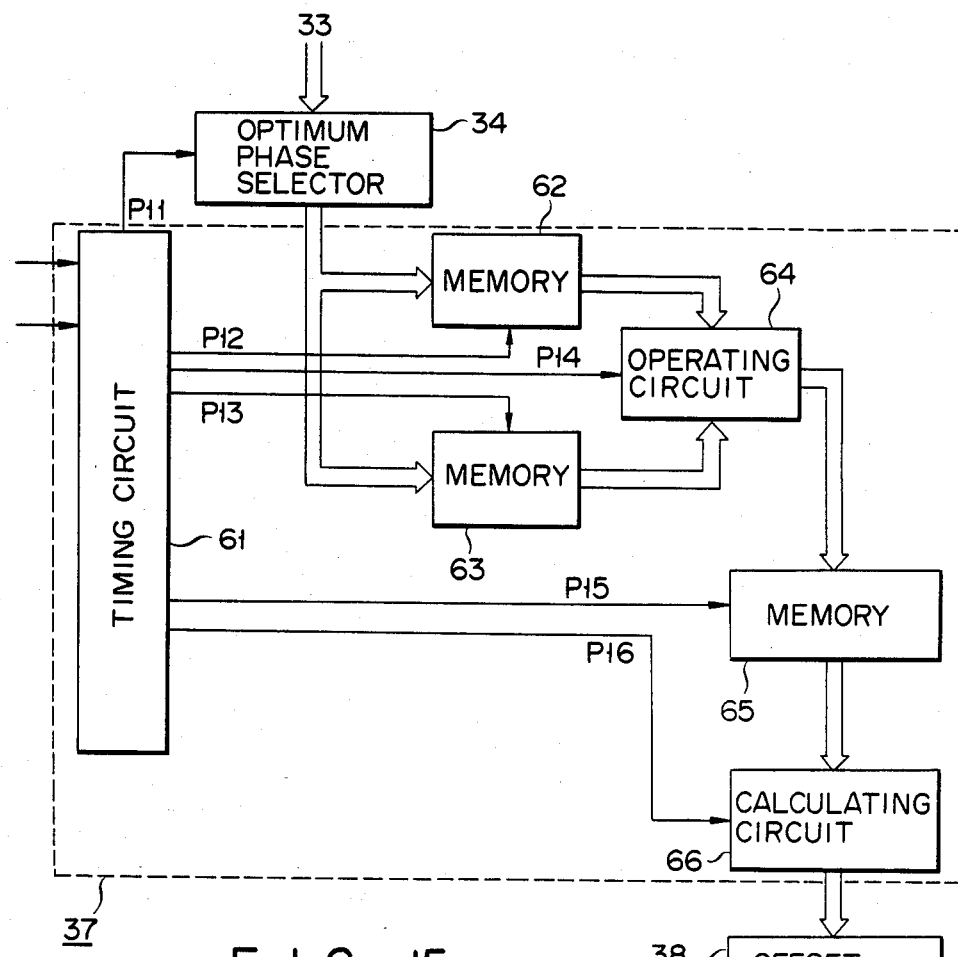
FIG. 14 is a block diagram illustrating a control section in the second embodiment shown in FIG. 12.

FIG. 14 shows a circuit arrangement of the controller 37. In response to a pulse P11 from a timing circuit 61, the optimum phase selector 34 produces data. Of the output data, the optimum phase select data on the clock-run-in signal is stored into a first memory 62 at the timing of a pulse P12. The optimum phase select data on the succeeding data is stored into a second memory 63 at the timing of a pulse P13. The output data from both the memories 62 and 63 are input to an offset operating circuit 64 at the timing of a pulse P14. The offset data is calculated here and input to an offset data memory 65 at the timing of a pulse P15. If the detecting operation of the offset data is performed 20 times, a mean offset data calculating circuit 66 calculates mean offset data at the timing of a pulse P16. The mean offset data is set in the offset data generator 38. Until the mean offset data is obtained, the optimum phase select data on the clockrun-in signal thus far obtained is applied to the clock selector 25.

Figure 15:
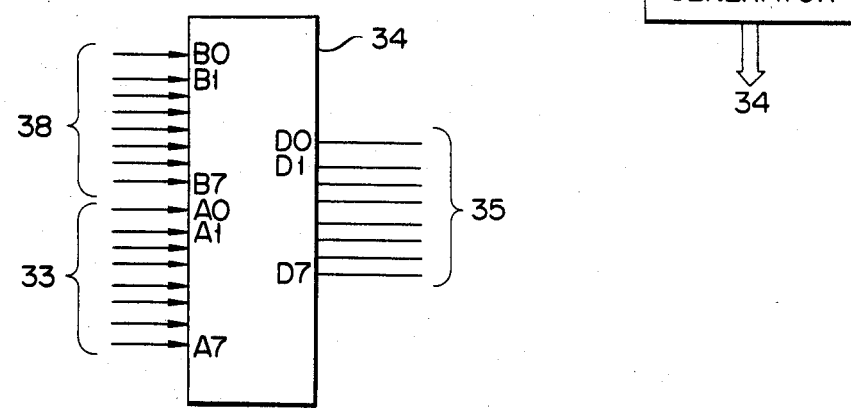
FIG. 15 shows a circuit diagram illustrating in detail a part of the circuit of FIG. 12.

FIG. 15 shows an arrangement of an optimum phase selector 34 used in this embodiment. The phase data from the threshold level judger 33 is applied to the lower order addresses A0-A7 at the input. The mean offset data from the offset data generator 38 is supplied to the upper order addresses B0-B7 at the input. FIGS. 16 and 17 tabulate clock determining data output from the output terminals D0-D7 of the selector 34 against the input data applied to the upper and the lower order addresses as mentioned above. The clock determining data shown in FIG. 16, which shows that the mean data output from the generator 38 is "0", is not shifted at all. In contrast, the clock determining data shown in FIG. 17, which shows that the mean data has changed from "0" to "1", is shifted by one bit.

As described above, the sampling clock pulse generator of this embodiment synchronizes not only with the clock-run-in signal as a reference to the data sampling, but also directly with the actually incoming data.

What is claimed is:

1. A sampling clock pulse generator comprising:
   means for supplying first signals;
   means for supplying a plurality of clock signals, said clock signals having the same frequency and differing phases, but having the same phase differences from one clock signal to the next;
   detection means, connected to and receiving the output from said first signal supplying means and said clock signal supplying means, for generating phase distribution data in response to said first signal being in phase with one of said clock signals;
   counter means, connected to and receiving said phase distribution data from said detection means, for counting said phase distribution data and generating a counting output indicative thereof; and
   selector means, connected to and receiving the output from said counting means and said clock signal supplying means, for selecting one of said clock signals in response to said counting output from said counting means, and for outputting said selected clock signal as a sampling pulse.

2. A sampling clock pulse generator according to claim 1 wherein said generator is for sampling data signals which are transmitted subsequently to each of said first signals.

3. A clock pulse generator according to claim 1 wherein said first signals are clock-run-in signals.

4. A sampling clock pulse generator according to claim 3, wherein said clock signals have a frequency equal to an intergral multiple of the frequency of said sampling pulse.

5. A sampling clock pulse generator according to claim 3 wherein said selector means includes data means for providing reference data such that said data means generates optimum phase data in accordance with said reference data and said counting output, and said selector means further includes comparison means, connected to and receiving the output from said data means and said clock signal supplying means, for comparing said clock signals and producing a comparative output, and said select means selects and outputs said sampling pulse in accordance with said comparative output from said comparison means.

6. A sampling clock pulse generator according to claim 3, wherein said detection means includes a plurality of sampling circuits for receiving one of said clock signals and said first signal and generating an output, any adjacent two of said sampling circuits forming a pair, said detection means further including a plurality of logic circuits each of said logic circuits being coupled to one of said pairs of sampling circuits, wherein each of said logic circuits provides an output in response to the output from the pair of sampling circuits to which it is coupled, said logic circuit outputs collectively forming said phase distribution data, and
   wherein said counting means includes a plurality of counters, each of said counters being connected to and receiving the output from one of said logic circuits.

7. A sampling clock pulse generator according to claim 6 wherein said counting means further includes a plurality of threshold detection means connected to and receiving the output from said logic circuits, for determining that said counting means outputs from said logic circuits exceeds a predetermined level as determined by said threshold detection means.

8. A sampling clock pulse generator for sampling a data signal which is cyclically transmitted subsequently to a clock-run-in signal, said sampling clock pulse generator comprising:
   means for selectively inputting at least one of said clock-run-in signal and said data signal;
   source means for supplying a plurality of clock signals having the same frequency and phase differences among one another;
   detection means for receiving at least one of said clock-run-in signal said data signal and said clock signals and generating therefrom first outputs and second outputs respectively as said detection means detects that at least one of said clock-run-in signal and said data signal is in phase with any clock signal;
   counter means for receiving and counting at least one of said individual first outputs and said seocnd outputs, and generating therefrom third outputs and fourth outputs respectively, which form respective phase distribution data of said clock-run-in signal and said data signal;
   data means for receiving said third output and said fourth output, and providing first reference data for obtaining first optimum phase data from said third output and second reference data for obtaining second optimum phase data from said fourth output;
   caculating means for receiving said first reference data and said second reference data, and calculating the differences between said first reference data and said second reference data at different times, and obtaining the average of these differences, and outputting the average of the differences as offset data;
   offset means for receiving said first reference data and said offset data for making said first optimum data correspond to said second optimum data in accordance with said offset data and said first reference data, and generating therefrom selection data; and
   selector means for receiving said clock signals and said selection data from said offset means, and for selecting one of said clock signals in accordance with said selection data, and for outputting the selected clock signal as a sampling pulse.

* * * * *